US006964522B2

(12) United States Patent
Kang et al.

(10) Patent No.: US 6,964,522 B2

(45) Date of Patent: Nov. 15, 2005

(54) HYDRODYNAMIC JOURNAL FOIL BEARING SYSTEM

(75) Inventors: Sun Goo Kang, Los Angeles, CA (US); Marshall Saville, Torrance, CA (US)

(73) Assignee: Honeywell International Inc., Morristown, NJ (US)

( * ) Notice: Subject to any disclaimer, the term of this patent is extended or adjusted under 35 U.S.C. 154(b) by 78 days.

(21) Appl. No.: 10/763,775

(22) Filed: Jan. 22, 2004

(65) Prior Publication Data

US 2005/0163407 A1 Jul. 28, 2005

(51) Int. Cl.[7] ............................................ F16C 32/06

(52) U.S. Cl. ........................ 384/103; 384/104; 384/106

(58) Field of Search ................................ 384/103, 104, 384/106

(56) References Cited

U.S. PATENT DOCUMENTS

| | | | | |
|---|---|---|---|---|
| 4,133,585 | A | | 1/1979 | Licht |
| 4,178,046 | A | | 12/1979 | Silver et al. |
| 4,277,112 | A | | 7/1981 | Heshmat |
| 4,295,689 | A | | 10/1981 | Licht |
| 4,300,806 | A | | 11/1981 | Heshmat |
| 4,415,281 | A | | 11/1983 | Agrawal |
| 4,445,792 | A | | 5/1984 | Trippett |
| 4,526,483 | A | | 7/1985 | Hishikawa et al. |
| 4,743,126 | A | | 5/1988 | Soum et al. |
| 5,059,038 | A | | 10/1991 | Domes et al. |
| 5,116,143 | A | | 5/1992 | Saville et al. |
| 5,228,785 | A | | 7/1993 | Saville et al. |
| 5,427,455 | A | | 6/1995 | Bosley |
| 5,498,083 | A | | 3/1996 | Brown |
| 5,529,398 | A | | 6/1996 | Bosley |
| 5,634,723 | A | | 6/1997 | Agrawal |
| 5,658,079 | A | * | 8/1997 | Struziak et al. ............. 384/106 |
| 5,827,040 | A | | 10/1998 | Bosley et al. |
| 5,902,049 | A | | 5/1999 | Heshmat |
| 5,911,510 | A | * | 6/1999 | Saville ....................... 384/103 |
| 5,915,841 | A | | 6/1999 | Weissert |
| 5,918,985 | A | | 7/1999 | Bosley |
| 5,961,217 | A | | 10/1999 | Heshmat |
| 5,988,885 | A | | 11/1999 | Heshmat |
| 6,158,893 | A | | 12/2000 | Heshmat |
| 6,190,048 | B1 | | 2/2001 | Weissert |
| 6,224,263 | B1 | | 5/2001 | Saville et al. |
| 6,450,688 | B2 | | 9/2002 | Matsushima |
| 6,489,692 | B1 | | 12/2002 | Gilbreth et al. |
| 6,505,837 | B1 | | 1/2003 | Heshmat |
| 2002/0097927 | A1 | | 7/2002 | Lee et al. |
| 2002/0125779 | A1 | | 9/2002 | Qin et al. |
| 2002/0149205 | A1 | | 10/2002 | Gilbreth et al. |
| 2003/0012466 | A1 | | 1/2003 | Shimizu et al. |

OTHER PUBLICATIONS

International Search Report dated Jun. 6, 2005.

* cited by examiner

*Primary Examiner*—Thomas R. Hannon
(74) *Attorney, Agent, or Firm*—Oral Caglar, Esq.

(57) ABSTRACT

A high load capacity hydrodynamic journal foil bearing system is disclosed, which comprises a top foil and a plurality of undersprings. Preload forces are transferred from the undersprings to internal circumferential compressive forces within a top foil, resulting in low preload forces against the shaft, allowing the shaft to expand at high speeds without increasing the preload forces or overloading the fluid film. One underspring may have a different spring rate than another underspring. The top foil may be normalized to shaft shape and dimensions. These features may be accomplished with using less mechanical parts than other journal foil bearing system designs.

67 Claims, 9 Drawing Sheets

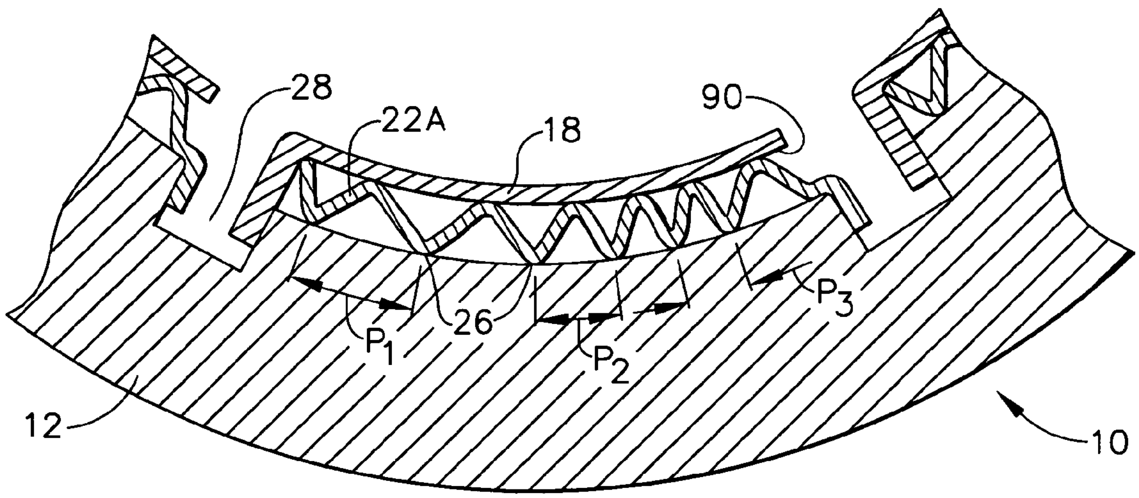
FIG. 6B
FIG. 6C
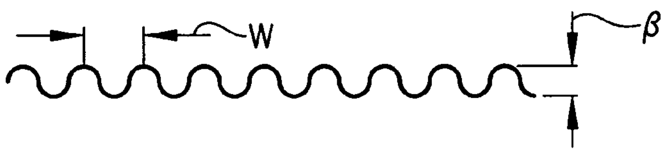
FIG. 6D
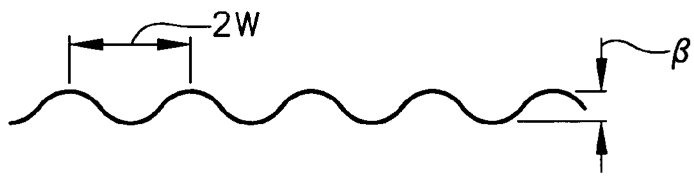
FIG. 6E
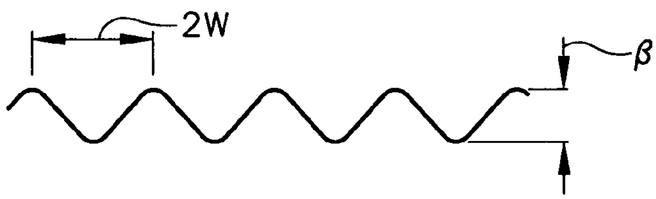
FIG. 6F
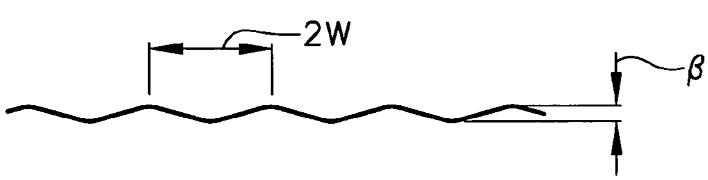
FIG. 6G
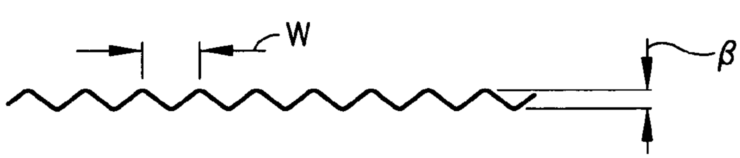

HYDRODYNAMIC JOURNAL FOIL BEARING SYSTEM

BACKGROUND OF THE INVENTION

This present invention relates generally to radial-type dynamic pressure fluid bearing systems and, in particular, to foil-type fluid bearing systems comprising a stationary retaining member that surrounds the outer circumference of a rotating journal shaft thereby forming an annular cavity. A foil assembly located in the cavity supports the journal.

Fluid bearing systems are used in many diverse applications requiring high speed rotating machinery. Fluid bearing systems generally comprise two relatively movable elements with a predetermined gap therebetween filled with a fluid, such as air. For example, a fluid bearing system may comprise a stationary bearing housing that surrounds a rotating shaft. Under dynamic conditions, gaps form between the relatively moving surfaces supporting a fluid pressure sufficient to prevent contact between the two relatively movable bearing elements.

Hydrodynamic fluid bearings have been developed by using foils in the gap between the relatively movable bearing elements. The hydrodynamic film forces between adjacent bearing surfaces deflect these foils, which are generally thin, pliable sheets of a compliant material. The foils enhance the hydrodynamic characteristics of the fluid bearing systems and provide improved operation under extreme loads. These foils also function to accommodate eccentricity, runout, and other non-uniformities in the motion of the relatively movable elements. The foils also provide a cushioning and damping effect.

The motion of a rotating element applies viscous drag forces to the fluid in a converging channel. This may result in fluid pressure increases throughout most of the channel. If a rotating element (for example, a shaft) moves toward a non-rotating element (for example, a foil), the fluid pressure increases along the channel. Conversely, if a rotating element moves away, the fluid pressure decreases along the channel.

Consequently, the fluid in the fluid bearing system exerts damping forces on the rotating element that vary with running clearances between the shaft surface and the top foil surface. Higher pressure along the channel provides more fluid film damping forces. These damping forces may stabilize non-synchronous shaft motion and prevent contact between the rotating and non-rotating elements. Any flexing or sliding of the foils may cause coulomb damping which also adds to the radial stability.

Due to preload spring forces or gravity forces, a rotating element of the bearing is typically in contact with the fluid foil members of the bearing at zero or low rotational speeds. This contact may result in bearing wear. Only when the rotor speed is above what is termed the lift-off/touch-down speed will the fluid dynamic forces generated in the channel assure a gap between the rotating and non-rotating elements.

Compliant fluid foil bearing systems typically rely on backing springs and top foils for preload, stiffness, and damping. The foils are preloaded against the relatively movable rotating element to control foil position/nesting and to establish dynamic stability. The bearing starting torque (which should ideally be zero) is proportional to the preload forces. These preload forces also significantly increase the rotational speed at which the hydrodynamic effects in the channel are strong enough to lift the rotating element of the bearing away from the non-rotating members of the bearing. These preload forces and high liftoff/touch-down speeds may result in significant bearing wear each time the rotor is started or stopped.

Conventional foil bearing systems obtain damping from the fluid film between the foil surface and the shaft, and from coulomb friction forces between the foils and undersprings. To increase damping, the typical design increases bearing preload forces that increase both the fluid damping and the coulomb damping. However, this design also increases the contact force between the shaft and foils, resulting in higher start torque before development of the hydrodynamic fluid film.

Conventional foil bearing systems may experience wrapping failure, which may occur when a top foil sticks to a rotating shaft, causing the top foil to undergo tension and tighten around the shaft, in effect, wrapping around the shaft. This wrapping effect dramatically increases the torque required to turn the shaft, which can prohibit turning or damage the bearing by pulling them out of its anchoring mechanism.

One design that attempts to effectively prevent wrapping failure is disclosed in U.S. Pat. No. 5,427,455 to Bosley. A compliant foil hydrodynamic fluid film radial bearing is disclosed, comprising a shaft, a top foil, a spring foil, and a foil-retaining cartridge. The cartridge is located within a bore and has circumferentially undulating cam shaped lobes, or circumferential ramps and joggles, that induce the spring and top foils to form converging fluid-dynamic channels that compress and pressurize the process fluid and diverging channels that draw in makeup fluid. A spring foil is formed as a thin, flat sheet having chemically etched slots of a pattern that cause cantilever beams to stand erect and function as springs when the foil is bent to install in the cartridge.

The Bosley design seeks to lower start torque and stall speed through minimizing radial force transmitted to the shaft. The Bosley design seeks to accomplish this by pushing the top foil circumferentially away from the shaft by using either only a preload bar or a flat circumferential preload spring at the ends of the top foil. Joggles on the top foil are used to ensure fluid film generation.

However, manufacturing difficulties, including costs for additional parts, make the use of preload bars or flat circumferential preload springs costly. Additionally, the level of distributed forces, or preload, between the outer circumference of the shaft and the top foil is very sensitive to the manufacturing variations in the shaft and the bore diameters and the bearing stack-up. Also, the circumferential spring and/or preload bar in the Bosley design and other prior art may keep the top foil from collapsing to the shaft; but the control of radial space between the top foil and the shaft is susceptible to variations in bore diameter and the underspring height. In Bosley's design, if the bore is smaller or if the underspring is taller, the space between the top foil and the shaft will become smaller (and vice versa for short undersprings or larger bore). When the space between the top foil and the shaft becomes too small, too much of the preload from the springs transfers to the shaft through the top foil, dramatically increasing the start torque. If the space between the top foil and the shaft becomes too large, the fluid film damping will decrease dramatically and the rotor will be susceptible to rotor instability.

The prior art is intended for allowing higher preload forces and higher coulomb damping without higher start torque, but does not improve fluid film damping and some suffer from one or more of the following disadvantages:

a) excessive start torque;

b) lower preload forces between the foils and the bore, which may cause lower damping forces;

c) lower tolerances for manufacturing variations;

d) wrapping;

e) higher parts costs.

As can be seen, there is a need for an improved apparatus for hydrodynamic fluid bearing systems wherein preload forces are transferred from the undersprings to internal circumferential compressive forces within a top foil, resulting in high pre-load between the bore and the top foil, while prohibiting the pre-load to be transferred to the shaft. The top foil should be allowed to expand at high shaft speeds to allow some growth in the film thickness at high shaft speeds, but restricting the film thickness from growing too thick and losing fluid film damping. There is also a need for bearing systems that can accommodate high manufacturing tolerances.

SUMMARY OF THE INVENTION

In one aspect of the present invention, a journal foil bearing system comprises a journal member; a shaft arranged for relative coaxial rotation with respect to the journal member; a top foil disposed between the shaft and journal member; the top foil comprising a leading edge and a trailing edge; wherein the leading edge and the trailing edge are pushed against each other; and wherein the trailing edge is disposed upstream, from the leading edge, in the direction of the relative coaxial rotation of the shaft.

In another aspect of the present invention, a journal foil bearing system comprises a journal member; a shaft arranged for relative coaxial rotation with respect to the journal member; a top foil disposed between the shaft and journal member; the top foil comprising a leading edge and a trailing edge; wherein the leading edge and the trailing edge are pushed against each other; wherein the trailing edge is disposed upstream, from the leading edge, in the direction of the relative coaxial rotation of the shaft; a first underspring layer disposed between the top foil and the journal member; and a second underspring layer disposed between the first underspring layer and the journal member.

In yet another aspect of the present invention, a journal foil bearing system comprises a journal member, a shaft arranged for relative coaxial rotation with respect to the journal member, a top foil disposed between the shaft and journal member, the top foil comprising a leading edge and a trailing edge; wherein a distance between the trailing edge and the shaft is shorter than a distance between the leading edge and the shaft; wherein the trailing edge is disposed upstream, from the leading edge, in the direction of the relative coaxial rotation of the shaft; and a first underspring layer disposed between the top foil and the journal member, wherein a spring rate of a portion of the first underspring layer under the trailing edge or the top foil is higher than a spring rate of a portion of the first underspring layer under the leading edge of the top foil.

In an alternative aspect of the present invention, a journal foil bearing system comprises a journal member with a bore; a shaft arranged within the bore for relative coaxial rotation with respect to the journal member; a top foil disposed between the shaft and journal member; the top foil comprising a leading edge and a trailing edge; wherein the trailing edge is disposed upstream, from the leading edge, in the direction of the relative coaxial rotation of the shaft; wherein the leading edge and the trailing edge are pushed against each other; a first underspring layer disposed between the top foil and the journal member; a second underspring layer disposed between the first underspring layer and the journal member; a foil retention slot in communication with the bore; and tabs in the top foil, the first underspring layer, and the second underspring layer, wherein the tabs are fit into the foil retention slot to secure the top foil against wrapping.

In yet another aspect of the present invention, a journal foil bearing system comprises a journal member with a bore; a shaft arranged within the bore for relative coaxial rotation with respect to the journal member; a top foil disposed between the shaft and journal member; the top foil comprising a leading edge and a trailing edge; wherein a distance between the trailing edge and the shaft is shorter than a distance between the leading edge and the shaft; wherein the trailing edge is disposed upstream, from the leading edge, in the direction of the relative coaxial rotation of the shaft; a plurality of first undersprings disposed between the top foil and the journal member; wherein the plurality of first undersprings are circumferentially separated from one another a plurality of second undersprings disposed between the first undersprings and the journal member, a plurality of foil retention slots in communication with the bore; and tabs in the top foil, the first undersprings, and the second undersprings, with the tabs allowing the top foil, the first undersprings, and the second undersprings to be fitted into the foil retention slots and secured against wrapping.

In a further aspect of the present invention, a journal foil bearing system comprises a journal member with a bore; a shaft arranged within the bore for relative coaxial rotation with respect to the journal member; a top foil disposed between the shaft and journal member; the top foil comprising a leading edge and a trailing edge; wherein a distance between the trailing edge and the shaft is shorter than a distance between the leading edge and the shaft; wherein the trailing edge is disposed upstream, from the leading edge, in the direction of the relative coaxial rotation of the shaft; wherein the leading edge and the trailing edge are pushed against each other; an underspring disposed between the top foil and the journal member; a foil retention slot in communication with the bore; and tabs in the top foil and the underspring, with the tabs allowing the top foil and the underspring to be fitted into the foil retention slot and secured against wrapping, wherein the underspring is wound at least twice around the circumference of the top foil.

In still yet another aspect of the present invention, a journal foil bearing system comprises a journal member; a shaft arranged for relative coaxial rotation with respect to the journal member; a top foil disposed between the shaft and journal member; a first underspring layer disposed between the top foil and the journal member; a second underspring layer disposed between the first underspring layer and the journal member; wherein the first underspring layer provides a variable underspring force for supporting the top foil and maintaining an approximately wedge shaped uniform spacing between the top foil and the shaft; wherein the spacing is matched to the changing pressure force along a circumferential length of the top foil; a first anti-telescoping tab located at a leading edge of the top foil; a second anti-telescoping tab located at a trailing edge of the top foil; the first anti-telescoping tab shorter than the second anti-telescoping tab; an anti-wrapping tab located at the distal end of the second anti-telescoping tab; wherein a distance between the trailing edge and the shaft is shorter than a distance between the leading edge and the shaft; wherein the trailing edge is disposed upstream, from the leading edge, in the direction of the relative coaxial rotation of the shaft; and wherein the leading edge and the trailing edge are pushed against each other;.

These and other aspects, objects, features and advantages of the present invention, are specifically set forth in, or will become apparent from, the following detailed description of the invention when read in conjunction with the accompanying drawings.

BRIEF DESCRIPTION OF THE DRAWINGS

FIG. 6B is an enlarged view illustrating an alternate mounting arrangement for the undersprings of FIG. 4A;

FIGS. 6C–6J are end views of corrugations of the undersprings in FIG. 4A;

DETAILED DESCRIPTION OF THE INVENTION

Figure 1:
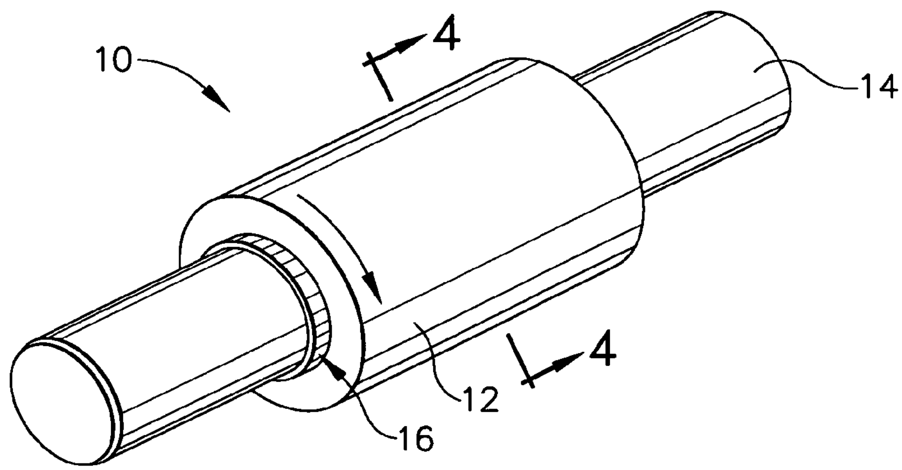
FIG. 1 is a perspective view of an exemplary foil journal bearing, according to an embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The invention is useful for high speed rotating machinery. The present invention relates to pneumatic journal bearings supporting a rotating shaft of a variety of high speed rotating systems, such as auxiliary power units for aircraft or air conditioning machines and, more particularly, to a gas foil journal bearing having a foil with both a top foil and plurality of undersprings which have a high supporting capacity of the shaft when highly loaded and a high damping capacity. Additionally, the top foil has a leading edge and a trailing edge that push against each other to maintain the top foil shape when starting or stopping high speed rotating machinery.

Also, foil bearing systems of the present invention are suitable for high-speed machines such as cryogenic turbo-rotors with both expander and compressor wheels running at tens of thousands of rpm or more. These bearings may also be used in the presence of liquid or cryogenic substances or mixed-phase lubrication. Foil bearings may achieve long service life with no scheduled maintenance as well as avoid air cabin contamination by eliminating the oil lubrication system required by conventional ball bearings. The foil bearing system of the present invention accommodates position fluctuations relative to the rotating element in the bearing to minimize damage to aerodynamic components in the event of a system malfunction.

Bearings in certain military aircraft, such as fighters, must meet the additional requirements of very high speed and severe gyroscopic moments with compact construction (for example, light weight, small rotor, and high ambient temperatures). Furthermore, optimal output power and efficiency of brushless electric motors/generators are realized at higher speeds, in the range beyond 60,000 rpm. Conventional foil bearing systems, containing only one layer of underspring, are considered incapable of meeting these speeds and operating conditions. Furthermore, motor-driven compressor systems, turbo-alternators, and turbochargers put stringent demands on the application of these bearings. Foil bearing systems in these motor-driven compressor systems and turbo-alternators must have the ability to accommodate misalignment, rotor vibrations, shock loading, centrifugal growth, and elastic and thermal distortions, as well as the ability to provide sufficient damping and stiffness for stability.

Radial displacement of a journal member, supported by the fluid pressure within a foil assembly, generates frictional damping forces on the sliding faces of a top foil and undersprings, thereby suppressing vibration of a journal member. However, since some conventional arrangements employ only a top foil and one flat spring with joggles and cam lobes, it is difficult to generate a sufficient level of frictional damping force, leading to a possibility that the journal member might undergo a damaging resonance phenomenon. Increase in the preload is necessary to increase damping. The increase in the preload may directly increase the start torque because the shaft may absorb all of the preload generated by the foils and springs.

In contrast to past designs, the present invention provides a top foil positioned in the innermost layer of the foil assembly to receive a radially inward preload that is present between the top foil and the journal member. Most of this preload is not transferred to the shaft, which decreases the start torque. This foil will also receive a radially outward load from the fluid film that is present between the top foil and the shaft and this load is transmitted from the top foil to a stationary retaining member via a first underspring layer and a second underspring layer. One underspring layer may serve to control preload contact pressure while the other underspring layer may serve to optimize the fluid pressure between the top foil and the shaft. Thereby, the present invention eliminates the need for a pre-load bar as in the '455 patent described above. Additionally, the impinging leading edge and trailing edge of the top foil maintain the top foil in an open position.

An exemplary journal foil bearing system 10 of the present invention is shown in FIG. 1. A journal member 12 may house a shaft 14 within a bore 30. The bore 30 may be of circular cross-section. The shaft 14 may be arranged for relative coaxial rotation with respect to the journal member 12 with a foil bearing 16 in between the shaft 14 and the journal member 12.

Figure 2:
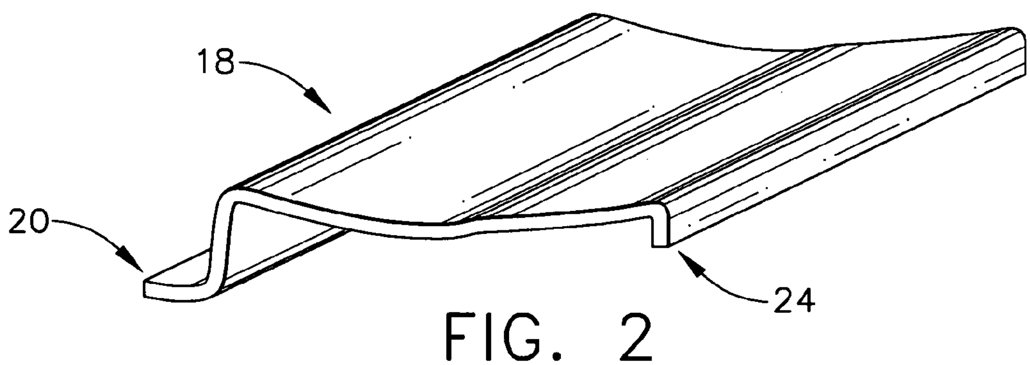
FIG. 2 is a perspective view of a top foil, according to an embodiment of the present invention.

A top foil 18 is shown in FIG. 2 before being bent around the shaft 14 to form part of the foil bearing 16. The top foil 18 may be of a thin compliant metal strip, having a curvature that is larger than the curvature of the journal member 12, with a tab 24 at one end or, both ends, for prevention of rotating or telescoping, as further described below. These tabs 24 may provide radial rigidity by securing the top foil 18 around the inner diameter of the journal member 12. After bending, the top foil 18 may be disposed between the shaft 14 and the journal member 12. The top foil 18 may be made from any material suitable for extreme temperatures, resistance to corrosion, and other extreme conditions. Suitable materials include nickel alloy, beryllium-copper, carbon fiber, and stainless steel.

Figure 3:
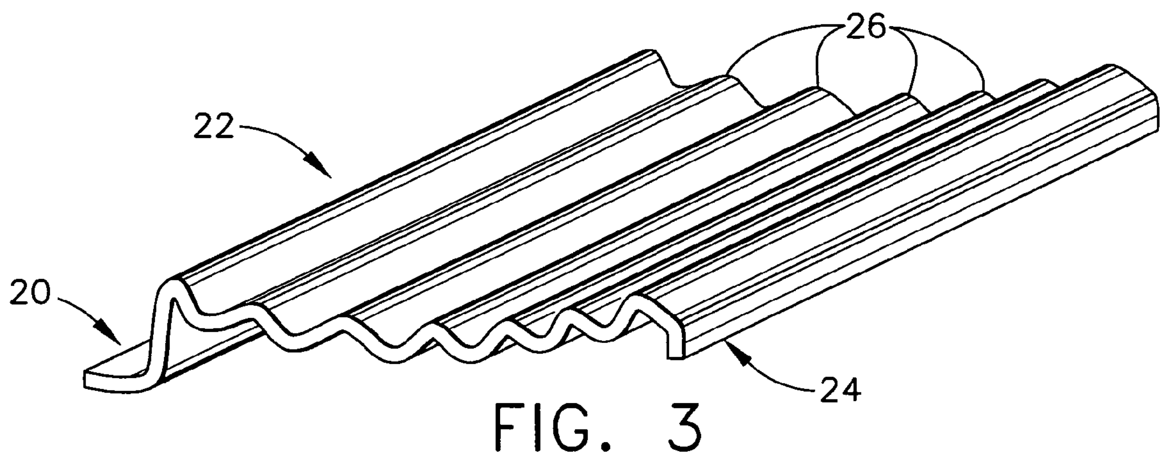
FIG. 3 is a perspective view of an underspring, according to an embodiment of the present invention.

An underspring 22 is shown in FIG. 3. The underspring 22 may be of a thin compliant metal strip, having a curvature that is larger or smaller than the curvature of the journal member 12, with a tab 24 at one end or both ends for prevention of rotating or telescoping, as further described below. Optionally, the underspring 22 may have corrugations 26 to accommodate expansion, excursions, and any misalignment. The underspring 22 can be made from the same material as the top foil 18, or from any material suitable for extreme conditions, such as increased load capacity, e.g., 100 psi or more, at high speeds of perhaps 60,000 rpm or more while being subjected to high temperatures of perhaps 650 degrees C. or higher and resistance to corrosion.

Figure 4A:
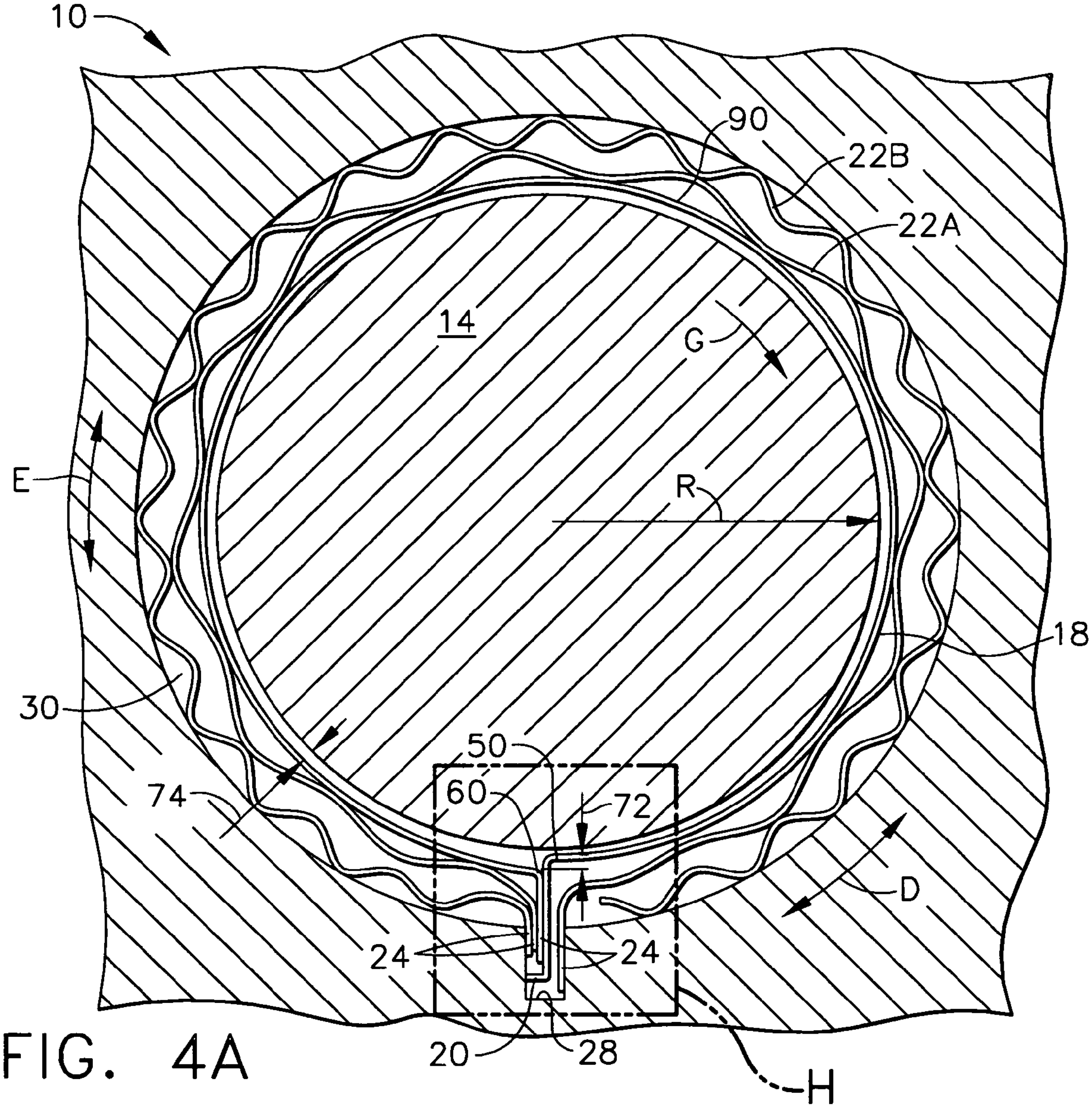
FIG. 4A is a side view in section of a foil journal bearing, as seen along line 4—4 in FIG. 1, according to an embodiment of the present invention.

FIG. 4A illustrates an embodiment of the present invention, that may comprise a first underspring 22A (such as underspring 22 in FIG. 3) that may be disposed as a first layer between the top foil 18 (such as in FIG. 2) and the journal member 12 (such as in FIG. 1), and a second underspring 22B (such as underspring 22 in FIG. 3) may be disposed as a second layer between the first underspring 22A and the journal member 12. The present invention may comprise two or more layers of undersprings, which exert higher pressure between undersprings 22A, 22B and the top foil 18. The plurality of layers of undersprings 22A, 22B of the present invention more easily provides the preload against the top foil 18, helps control the size of a fluid film gap 74, between the shaft 14 and the top foil 18, and maintains the top foil 18 location. The fluid film gap 74 may be thin for damping. The length of the top foil 18 controls the fluid film gap 74 between the shaft 14 and the top foil 18. If the fluid film gap 74 is too large (e.g., when the top foil 18 length is too long), then low fluid film damping occurs. If the fluid film gap 74 is too small (e.g., when the top foil 18 length is too short) then preload may be transferred to the shaft 14, from the top foil 18 contacting the shaft 14. The top foil 18 working length 80 and the shaft 14 diameter may be the only factors that will determine the spacing between the top foil 18 and the shaft 14. If the spacing between the shaft 14 and the top foil 18 becomes too large, loss of damping and stiffness may occur, causing the shaft 14 to become unstable. Additionally, the present invention is designed so that most of the preload may not be transferred onto the shaft 14, but retained by the top foil 18 with ends 50, 60 that abut each other.

If temperature increases during high performance conditions, the shaft 14 may increase in radius R (high speed may also result in increase in the shaft 14 radius R due to centripetal force). As the shaft 14 radius R increases, the top foil 18 and the undersprings 22A, 22B get pushed radially outward, keeping the fluid film thickness relatively constant. Radial displacement of the shaft 14, supported by the fluid pressure on the top foil 18, can generate large frictional damping forces between the outer circumference 90 of the top foil 18 and undersprings 22A, 22B, thereby suppressing vibration of the journal member 12.

The first underspring layer 22A and the second underspring layer 22B may have a non-linear behavior, with radial forces that vary in the circumferential direction. Also, providing longer cantilever beams 40 ($\epsilon_3$) near the leading edge 60 may make the spring rate (in the radial direction) decrease at the leading edge 60. With a lesser spring rate at the leading edge 60, the wedge-shaped gap 72 may be formed as the shorter cantilever beams 40 ($\epsilon_1$) at the trailing edge 50 have a higher spring rate (in the radial direction), such that trailing edge 50 is closer to the shaft 14, than the leading edge 60.

Also, unlike the prior art, the present invention prevents the top foil 18 from collapsing on the shaft 14 while the outer circumference 90 of the top foil 18, upon starting rotation, is preloaded radially. This may be achieved by using the top foil 18 structure and by using the first underspring layer 22A with a low spring rate that is lower (i.e. "softer" or "less stiff") than the second underspring layer 22B which may have a high spring rate (i.e. "harder" or "stiffer"). A soft spring 22A may serve to moderate contact pressure between a hard spring 22B and the top foil 18. The low stiffness of the soft spring 22A also allows more even distribution of the force from the harder spring 22B over the outer circumference 90 of the top foil 18. The top foil 18 with tabs 20, 24 at both ends may provide radial rigidity that will keep the top foil 18 from collapsing on to the shaft 14 when distributed radial forces are applied from the springs 22A, 22B. Therefore, we may obtain high preload between the top foil 18 and the journal member 12 without transferring the same preload to the shaft 14.

An anti-wrapping tab 20 may be dimensioned to secure the top foil 18 from wrapping, as described below. The leading edge 60 and the trailing edge 50 meet in normal operation. In contrast, the ends of top foils in the prior art do not typically meet. A distance between the trailing edge 50 and the shaft 14 is shorter than a distance between the leading edge 60 and the shaft 14. This relationship may be accomplished by having the spring rate at a portion of undersprings 22A, 22B under the trailing edge 50 be higher (i.e., stiffer spring) than the spring rate at a portion of undersprings 22A, 22B under the leading edge 60. The top foil 18 ends may be disposed such that the trailing edge 50 is disposed upstream, from the leading edge 60, in the direction G of the relative coaxial rotation of the shaft 14. The difference in distances from the shaft 14 between the trailing edge 50 and the leading edge 60 (absolute value of distance between the trailing edge 50 and the leading edge 60) is a wedge-shaped gap 72.

An underspring, for example second underspring layer 22B, may be formed of a material thicker than another underspring, for example, first underspring layer 22A. In this situation, the thicker underspring 22B would be "stiffer" or have a higher spring rate than the thinner underspring 22A. Relative spring rates are interchangeable; in that second underspring layer 22B may have the lower spring rate while the first underspring layer 22A may have a higher spring rate. Likewise, first underspring layer 22A may have a lower spring rate than the spring rate of the second underspring layer 22A. An underspring, for example second underspring layer 22B, may be formed of a material that is about the same thickness as another underspring, for example, first underspring layer 22A.

In FIG. 4A, a foil retention slot 28, in communication with the bore 30, may be used for maintaining the installed position of the top foil 18 and the undersprings 22A, 22B by securing tabs 20, 24 within the foil retention slot 28. The undersprings 22A, 22B do not necessarily have to be synchronized such that peaks and valleys match. An anti-wrapping tab 20 may be affixed to an end of the top foil 18, the first underspring layer 22A, or the second underspring layer 22B, for example, by spot welding. Also, the anti-wrapping tab 20 may be an integral portion of the top foil 18, the first underspring layer 22A, or the second underspring layer 22B, bent at an angle and adapted to be held into foil retention slot 28. Likewise, an anti-telescoping tab 24 may be affixed to an end of the top foil 18, the first underspring layer 22A, or the second underspring layer 22B, for example, by spot welding. Also, the anti-telescoping tab 24 may be an integral portion of the top foil 18, the first underspring layer 22A, or the second underspring layer 22B, bent at an angle and adapted to be held into foil retention slot 28. The slot 28 and the tabs 20, 24 may be of a shape suitable to secure the foils (for example, top foil 18, and undersprings 22A, 22B), for example, an L- or Z-shaped slot 28.

Figure 4B:
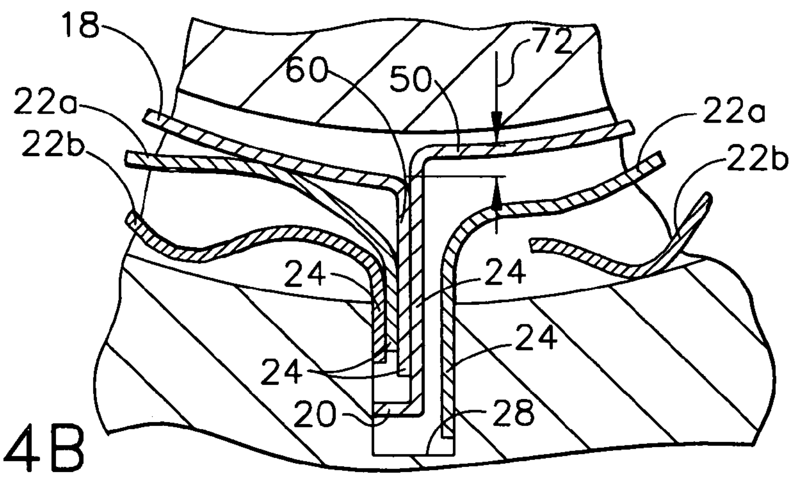
FIG. 4B is an enlarged view of the foil retention slot area H depicted in FIG. 4A, according to an embodiment of the present invention.

As shown in FIG. 4B, an approximately wedge-shaped gap 72 may be located between the top foil 18 and the shaft 14 at the leading edge. This assures that a fluid film may be developed within the wedge-shaped gap 72. The film pressure from the fluid film can provide a bearing effect for the shaft 14 floating in the fluid, enabling rotation of the shaft 14 at a lower speed than otherwise obtainable.

Figure 5:
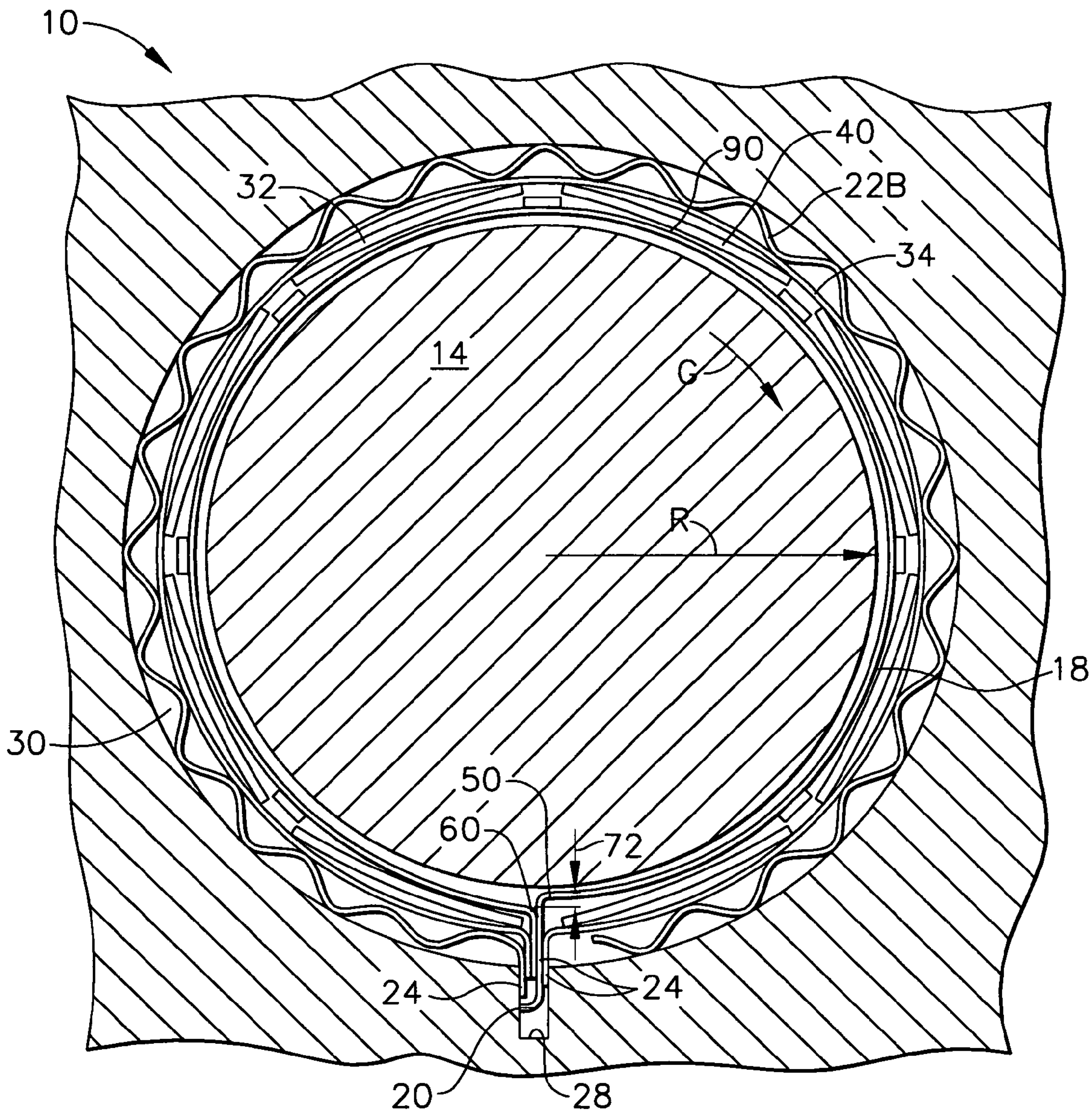
FIG. 5 is a side view in section of a foil journal bearing, as seen along line 4—4 in FIG. 1, according to another embodiment of the present invention using an etched spring foil.

With reference to FIG. 4A, the journal bearing 10 can be adapted to prevent failure of the top foil 18. Such failure may be manifested, for example, by wrapping. This wrapping effect may occur when the shaft 14 rotation induces circumferential tensile stresses, shown by arrow E, in the top foil 18 Only circumferential tensile stresses, shown by arrow E, can cause the top foil 18 to tighten around the shaft 14 and potentially lead to failure of the top foil 18. Preventing such failure may be achieved through using anti-wrapping tab 20. The trailing edge 50 may be pushed towards the leading edge 60. Pushing the trailing edge 50 and the leading edge 60 against each other may prevent the top foil 18 from collapsing against the shaft. The anti-wrapping tab 20 may be fixedly held by inserting into foil retention slot 28, which may be dimensioned to snugly retain the anti-wrapping tab 20 within the confines of the foil retention slot 28. The anti-wrapping tab 20 may serve to prevent wrapping, which is failure (for example, the shaft 14 may lock up and cease rotation), in the circumferential direction, of the top foil 18. Anti-telescoping tab 24 may be fixedly held by insertion into foil retention slot 28, which may also be dimensioned to snugly retain the anti-telescoping tab 24 within the confines of the foil retention slot 28. The anti-telescoping tab 24 may serve to prevent the top foil 18 or the undersprings 22A, 22B from telescoping, which is failure in the axial direction wherein the top foil 18 or undersprings 22A, 22B move out the axial ends of the bore 30. The anti-telescoping tab 24 may prevent axial movement of the top foil 18. Additionally, the anti-telescoping tab 24 may provide a surface where ends 50, 60 may abut each other. Retaining rings or other features that block the slot 28 at the axial ends of the bearing could be used to prevent the top foils and undersprings from moving axially or telescoping in the housing. Another embodiment of the present invention is shown in FIG. 5. In contrast to the embodiment shown in FIG. 4A, at least one of the undersprings 22A, 22B may be in the form of a chemically etched spring foil 32. A shim 34 may be placed in between the etched spring foil 32 and the underspring 22B to aid in circumferential force distribution.

Figure 6A:
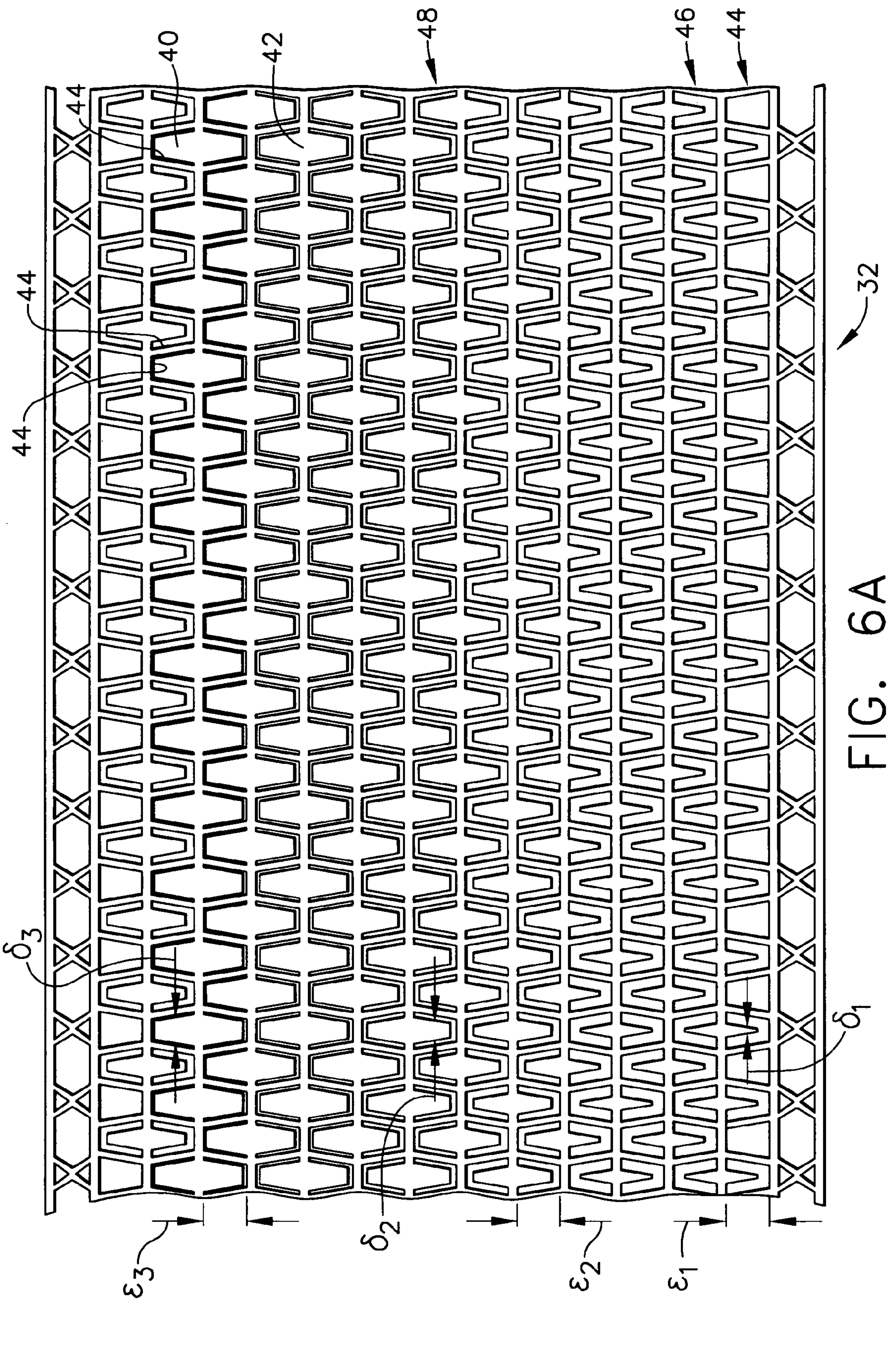
FIG. 6A is an enlarged view of a portion of an etched spring foil with cantilever beams, according to an embodiment of the present invention.

FIG. 6A shows an enlarged view of a portion of the chemically etched spring foil 32, which may comprise a plurality of cantilever beams 40. The etched spring foil 32 may be formed as a thin, flat sheet having chemically etched slots 44 of a spring pattern 42 that causes cantilever beams 40 to stand erect, as shown installed in FIG. 5, and function as springs for radial forces when the foil 32 is bent to install inside the bore 30 of the journal member 10. The cantilever beams 40 may have heights and spring rates that vary along the length of converging fluid channel. As shown in FIG. 6A, the spring pattern 42 may comprise cantilever beams 40 that are not uniformly shaped or dimensioned. Cantilever beams 40 of different sizes or shapes may have different spring rates. For example, a perimeter row 44 of cantilever beams 40 may be designed to have a different spring rate than an adjacent row 46 of cantilever beams 40. Furthermore, other rows, such as interior row 48 of cantilever beams 40, may have a different size and shape than either the perimeter row 44 or adjacent row 46.

Cantilever beams 40 may vary in pitch P and width W to optimize the spring force by providing different amounts of resilient material to support the top foil 18. For example, pitch P1 may be less in magnitude than pitch P2, which, in turn, may be less in magnitude than pitch P3. Likewise, cantilever beam 40 width W1 may be less in magnitude than width W2, which may be less in magnitude than width W3.

Figure 6H:
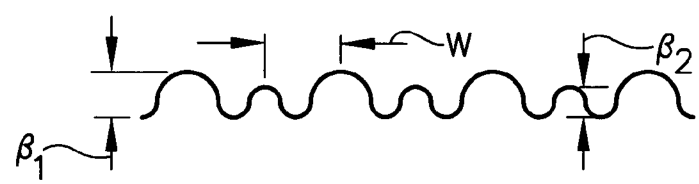
Figure 6I:
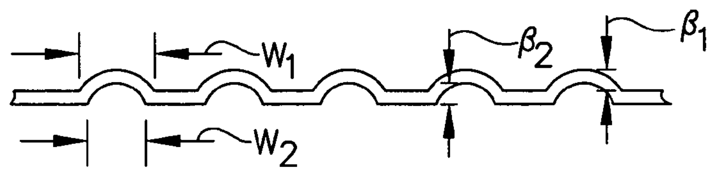
Figure 6J:
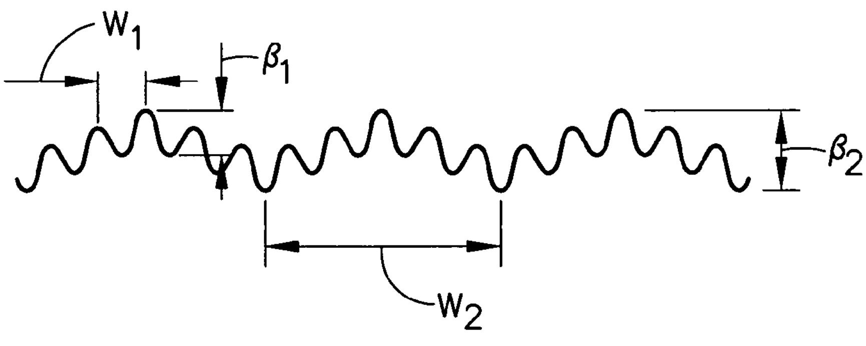

In FIG. 6B, underspring 22A may include a number of corrugations 26 which are varied in pitch P1, P2, P3 to vary the force distribution while supporting the top foil 18. The undersprings 22A, 22B may be in the shape of a periodic wave, several forms of which are illustrated in FIGS. 6C–6J. The undersprings 22A, 22B may also be in the shape of a periodic wave. Almost an infinite variety of forms may be made for the corrugations 26 by changing the wavelength W and/or the peak-to-peak wave amplitude β. By changing W and β, one can change implicitly the stiffness of the undersprings 22A, 22B and also the damping, which partly depends upon the frictional dissipation of energy due to tangential motion of the top foil 18 relative to the undersprings 22A, 22B. Alternating wave heights are shown in FIG. 6H, such that two or more alternating peak-to-peak wave amplitudes $\beta_1$ and $\beta_2$ may exist. $\beta_1$ and $\beta_2$ are not necessarily equal and using only one underspring 22A is optional. Similarly two different wave designs can be superimposed into one spring as shown in FIG. 6J. Nested corrugations are shown in FIG. 61, such that undersprings 22A, 22B may exist in a nested relationship, wherein $\beta_1$ and $\beta_2$ are not necessarily equal. Furthermore, changing the wave amplitude can vary the local bearing characteristics along its working length 80, which is the circumferential distance along the top foil 18 surface within the bore 30, excluding the tabs 20, 24 within the foil retention slot 28. Such variations can provide non-linear behavior to the undersprings 22A, 22B such that higher than normal loads are accommodated.

Figure 7:
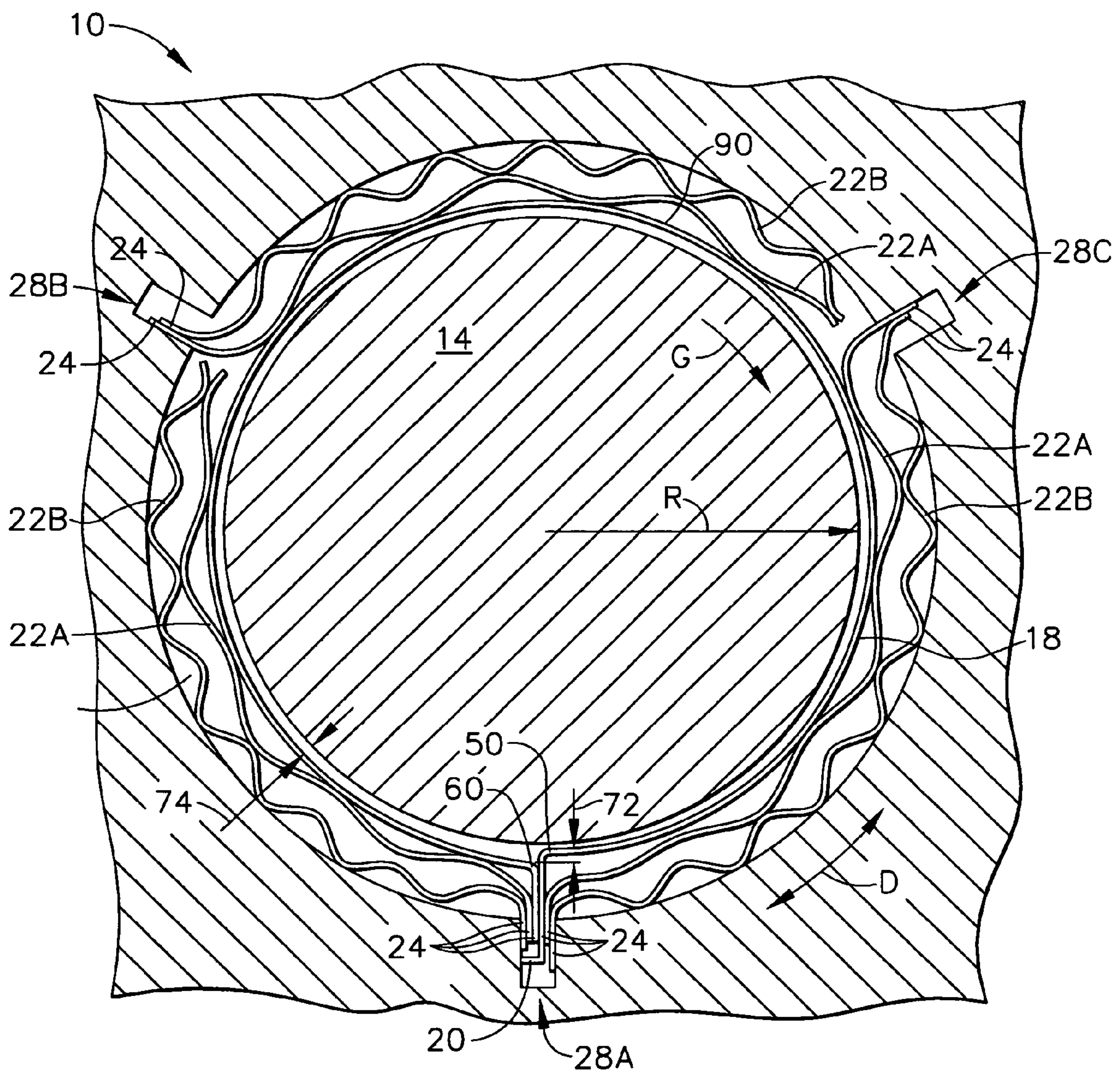
FIG. 7 is a side view in section of a foil journal bearing, as seen along line 4—4 in FIG. 1, according to an alternative embodiment of the present invention.

The fluid film gap 74 between the top foil 18 and the shaft 14 may remain constant (since the top foil 18 leading edge 60 and the trailing edge 50 are pushed against each other) regardless of the variations in spring 22 height and bore 30 size. The variations in spring 22 height and bore 30 size will change the preload only and not the fluid film gap 74 between the top foil 18 and the shaft 14. The top foil 18 working length 80 and the shaft 14 diameter may be the only factors that will determine the spacing between the top foil 18 and the shaft 14. If the spacing between the shaft 14 and the top foil 18 becomes too large, loss of damping and stiffness may occur, causing the shaft 14 to become unstable. In FIG. 7, another alternative embodiment is shown using a plurality of undersprings 22A, 22B and a plurality of foil retention slots 28A, 28B, and 28C instead of only one foil retention slot 28 as in FIG. 4A. A journal foil bearing system 10 may include a journal member 12 with a bore 30, and a shaft 14 arranged within the bore 30 for relative coaxial rotation with respect to the journal member 12. A top foil 18 may be disposed between the shaft 14 and the journal member 12. A plurality of first undersprings 22A may be disposed between the top foil 18 and the journal member 12, and a plurality of second undersprings 22B may be disposed between the first undersprings 22A and the journal member 12. The plurality of first undersprings 22A may be circumferentially separated and may be secured within a plurality of foil retention slots 28A, 28B, and 28C. The slots 28A–C may be in communication with or integral with the bore 30 and tabs 20, 24 in the top foil 18, the first undersprings 22A, and the second undersprings 22B. The tabs 20, 24 can allow the top foil 18, the first undersprings 22A, and the second undersprings 22B to be held in the foil retention slots 28A, 28B, 28C and secured against wrapping and telescoping.

Figure 8:
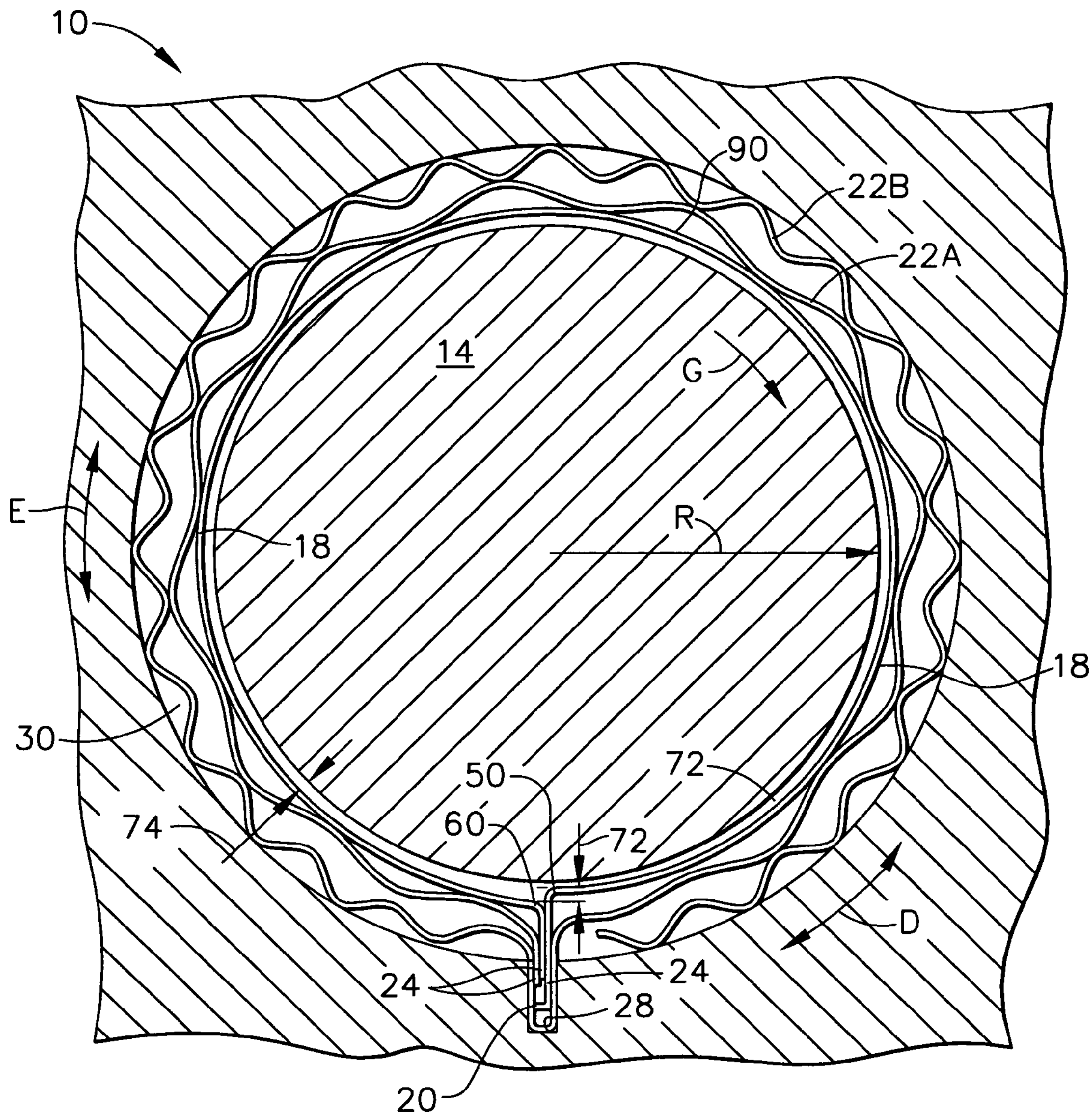
FIG. 8 is a side view in section of a foil journal bearing, as seen along line 4—4 in FIG. 1, according to still another alternative embodiment of the present invention

Still another embodiment of the present invention is shown in FIG. 8. In this embodiment, one underspring 22 may be used, instead of a plurality of undersprings 22A, 22B as in the above embodiments. A journal foil bearing system 10 may comprise a journal member 12 with a bore 30, and a shaft 14 arranged within the bore 30 for relative coaxial rotation with respect to the journal member 12. As described above in reference to FIG. 4A, a top foil 18 may be disposed between the shaft 14 and the journal member 12. However, instead of using two separate undersprings, one underspring 22, longer than the working length 80 of the top foil 18, is used. The underspring 22 may be wound at least twice around the circumference of the top foil 18. In other words, the underspring 22 is wound at least two times around the circumference 90 of the top foil 18. The underspring 22 may have two different spring rates, with one spring rate for the first winding around the top foil 18 and another spring rate for a subsequent winding around the top foil 18. The different spring rates may be accomplished by varying the corrugation 26 wave lengths W, peak-to-peak wave amplitudes $\beta$, cantilever beam 40 pitch $\epsilon$, or cantilever beam 40 widths $\delta$, as described above regarding FIGS. 6A–6J.

Figure 9:
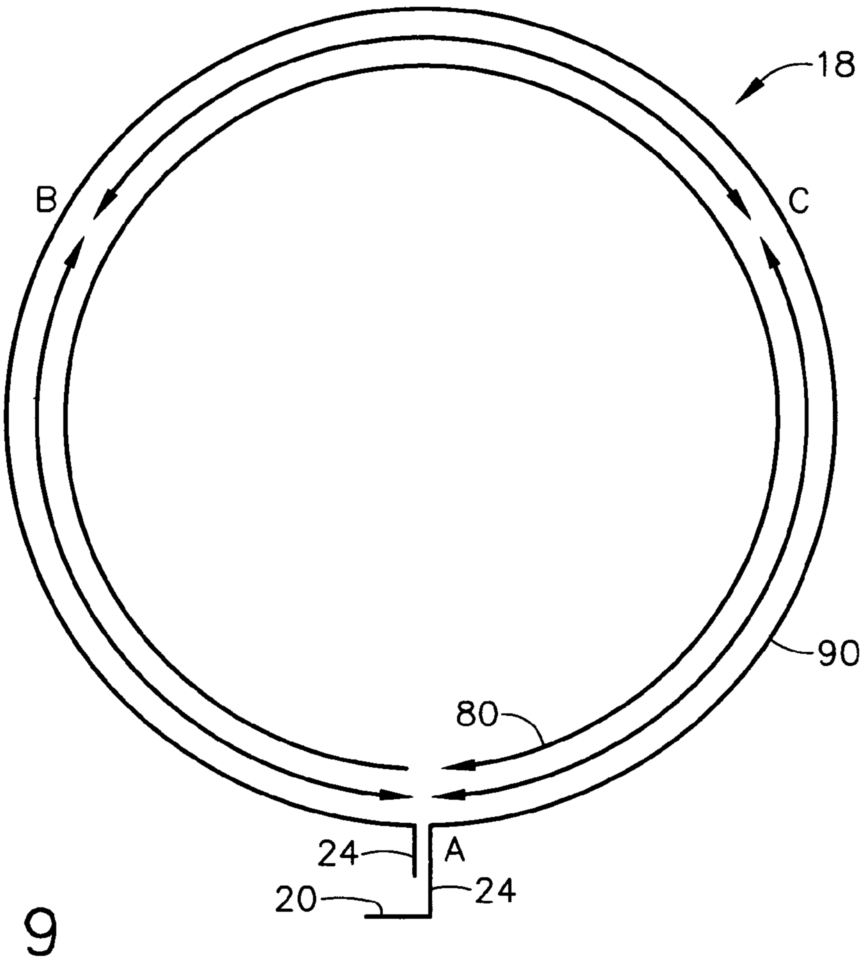
FIG. 9 is a side view in section of a top foil, as seen along line 4—4 in FIG. 1, according to yet another embodiment of the present invention.

FIG. 9 may be referenced to better appreciate how the top foil 18 may be dimensioned to accommodate bore 30 shape and dimensions and shaft 14 shape and dimensions. A wedge-shaped gap 72 may be formed by the combination of the top foil 18 radius as well as the spring rate difference along the circumference under the top foil 18 from the undersprings 22A, 22B. FIG. 9 shows the top foil 18 bent and inserted into bore 30, as described above regarding FIGS. 4A, 4B, 5, 7, and 8. Only the top foil 18 is shown in FIG. 9 for illustration purposes. To promote wedge-shaped gaps 72 and to optimize the pre-load distribution along the circumference, different radii of curvature may be present at different locations A, B, C along the working length 80 of the top foil 18. The top foil 18 working length may also be considered to be divided into various portions, for example, sector arc lengths along the inner circumference of top foil 18, in a clockwise direction. For example, a first arc sector length A-B may be measured between points A and B, a second arc sector length B-C may be measured between points B and C, and a third arc sector length C-A may be measured between points C and A.

To normalize the top foil dimensions to the shaft 14 radius, R (as shown in FIG. 4A), the total working length (sum of arc sector lengths A-B, B-C, and C-A) of the top foil 18 may be selected to be between about $1.0003(2\pi R)$ to about $1.010(2\pi R)$ in length along the inner circumference of the top foil 18, preferably between about $1.003(2\pi R)$ to about $1.010(2\pi R)$ in length along the inner circumference of the top foil 18. First arc sector length A-B and third arc sector length C-A may each be designed to be in the range from about $0.20(2\pi R)$ to about $0.40(2\pi R)$. Second arc sector length B-C may be designed to have a different length, for example, by subtracting A-B and C-A from the total working length (inner circumference of top foil 18).

Radii of curvature for the different lengths may also be designed to normalize the top foil dimensions to the shaft 14 radius R. The radius for first arc sector length A-B and the radius for third arc sector length C-A may each be in the range from about 1.05R to about 1.10R. The radius for second arc sector length B-C may be in the range from about 1.05R to about 5R, preferably from about 1.05R to about 1.5R, where R is the shaft 14 radius. The radii of curvature are measured before insertion of the top foil 18 into the journal member 12.

Figure 10:
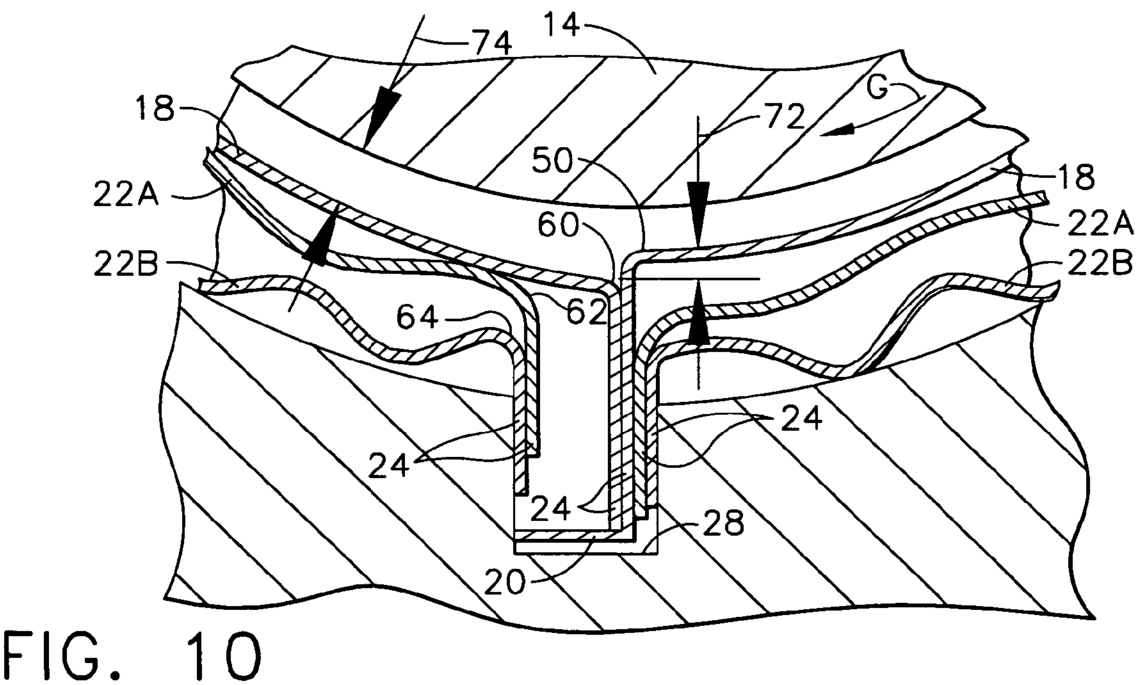
FIG. 10 is an enlarged view of the foil retention slot area H depicted in FIG. 4A, according to an embodiment of the present invention.

In FIG. 10, the foil retention slot 28 is shown in an enlarged view. The design may serve to mitigate crowding in the foil retention slot 28, which may occur when using a top foil 18, a first underspring 22A, and a second underspring 22B. As an example, seven tabs may be located within the foil retention slot 28. The top foil 18 may have the first tab, an anti-telescoping tab 24 at the trailing edge 50 of the top foil 18 and a second, anti-telescoping tab 24 at the leading edge 60 of the top foil 18. A third tab, an anti-wrapping tab 20, may be located at the distal end of the longer anti-telescoping tab 24, which may be attached to the trailing edge 50. A fourth tab, an anti-telescoping tab 24 may be located at the trailing edge 52 of the first underspring 22A and a fifth anti-telescoping tab 24 may be at the leading edge 62 of the first underspring 22A. The sixth tab, an anti-telescoping tab 24, may be located at the trailing edge 54 of the second underspring 22B and the seventh, an anti-telescoping tab 24 may be located at the leading edge 64 of the second underspring 22B.

Situating all of the seven tabs 20, 24 into the foil retention slot 28 may become difficult, especially if the foil retention slot is narrow. If, however, the width of foil retention slot 28 is increased, then the top foil 18 may lose its circularity. The trailing edges 50, 52, 54 and the leading edges 60, 62, 64 may potentially push radially outward if not well supported. If the top foil 18 loses circularity, then the top foil 18 may form a teardrop shape, where the flatter portions near the foil retention slot 28 may transmit excessive pre-load forces to the shaft 14 (shown in FIG. 4A).

The tab-support design shown in FIG. 10 may resolve this problem through controlled anti-telescoping tab 24 lengths and controlling the anti-wrapping tab 20 length. When the trailing edge 60 is pushed to the far right side of the foil retention slot 28, the trailing edge 60 will be supported by the spring bumps. Adequate length of the anti-wrapping tab 20 may ensure that the trailing edge 60 is pushed to the right. The leading edge 50 may be supported as the anti-telescoping tab 24 bent from the leading edge 50 rests on the anti wrapping tab 20. The anti-wrapping tab 20 may support the first anti-telescoping tab 24, which is at the leading edge 50 of the top foil 18.—Controlling the top foil 18 anti-telescoping tabs 24—on the leading edge 50, making it slightly shorter than the top foil 18 anti-telescoping tab 24 on the trailing edge 60, may help to maintain a wedge-shaped gap 72, as seen in FIGS. 5, 7, and 8.

Although the present invention has been described in considerable detail with reference to certain preferred versions thereof, other versions are possible. Therefore, the spirit and scope of the appended claims should not be limited to the description of the preferred versions contained therein.

We claim:

1. A journal foil bearing system comprising:

a journal member;

a shaft arranged for relative coaxial rotation with respect to the journal member;

a top foil disposed between the shaft and journal member;

the top foil comprising a leading edge and a trailing edge;

wherein the leading edge and the trailing edge are pushed against each other; and wherein the trailing edge is disposed upstream, from the leading edge, in the direction of the relative coaxial rotation of the shaft.

2. The journal foil bearing system of claim 1 wherein the top foil radius of curvature varies.

3. The journal foil bearing system of claim 2, wherein the top foil radius of curvature is in the range from about 1.005R to about 5R; wherein R is the shaft radius.

4. The journal foil bearing system of claim 3, wherein the top foil radius of curvature is in the range from about 1.05R to about 2R; wherein R is the shaft radius.

5. The journal foil bearing system of claim 1, wherein the top foil has a working length in the range from about 1.0003(2Rπ) to about 1.010(2Rπ);

wherein R is the shaft radius.

6. The journal foil bearing system of claim 5, wherein the top foil has a working length in the range from about 1.003(2Rπ) to about 1.010(2Rπ);

wherein R is the shaft radius.

7. The journal foil bearing system of claim 1, wherein the top foil comprises a material selected from the group consisting of nickel alloys, beryllium-copper, copper alloys, aluminum alloys, titanium alloys, carbon fiber, and stainless steel alloys.

8. A journal foil bearing system comprising:

a journal member;

a shaft arranged for relative coaxial rotation with respect to the journal member;

a top foil disposed between the shaft and journal member;

the top foil comprising a leading edge and a trailing edge;

wherein the leading edge and the trailing edge are pushed against each other;

wherein the trailing edge is disposed upstream, from the leading edge, in the direction of the relative coaxial rotation of the shaft;

a first underspring layer disposed between the top foil and the journal member; and a second underspring layer disposed between the first underspring layer and the journal member.

9. The journal foil bearing system of claim 8, wherein the second underspring layer is formed of a material that is thicker than a material of the first underspring layer.

10. The journal foil bearing system of claim 8, wherein the second underspring layer is formed of a material that is thinner than a material of the first underspring layer.

11. The journal foil bearing system of claim 8, wherein the second underspring layer is formed of a material that is about the same thickness as a material of the first underspring layer.

12. The journal foil bearing system of claim 8 wherein the top foil radius of curvature varies.

13. The journal foil bearing system of claim 12, wherein the top foil radius of curvature is in the range from about 1.005R to about 5R;

wherein R is the shaft radius.

14. The journal foil bearing system of claim 13, wherein the top foil radius of curvature is in the range from about 1.05R to about 2R;

wherein R is the shaft radius.

15. The journal foil bearing system of claim 8, wherein the top foil has a working length in the range from about 1.0003(2Rπ) to about 1.010(2Rπ);

wherein R is the shaft radius.

16. The journal foil bearing system of claim 15, wherein the top foil has a working length in the range from about 1.003(2Rπ) to about 1.010(2Rπ);

wherein R is the shaft radius.

17. A journal foil bearing system comprising:

a journal member;

a shaft arranged for relative coaxial rotation with respect to the journal member;

a top foil disposed between the shaft and journal member;

the top foil comprising a leading edge and a trailing edge;

wherein a distance between the trailing edge and the shaft is shorter than a distance between the leading edge and the shaft;

wherein the trailing edge is disposed upstream, from the leading edge, in the direction of the relative coaxial rotation of the shaft; and a first underspring layer disposed between the top foil and the journal member;

wherein a spring rate of a portion of the first underspring layer under the trailing edge or the top foil is higher than a spring rate of a portion of the first underspring layer under the leading edge of the top foil.

18. The journal foil bearing system of claim 17, further comprising a second underspring layer disposed between the first underspring layer and the journal member;

wherein a spring rate of a portion of the second underspring layer under the trailing edge of the top foil is higher than a spring rate of a portion of the second underspring layer under the leading edge of the top foil.

19. The journal foil bearing system of claim 18, wherein the second underspring layer is formed of a material that is thicker than a material of the first underspring layer.

20. The journal foil bearing system of claim 18, wherein the second underspring layer is formed of a material that is thinner than a material of the first underspring layer.

21. The journal foil bearing system of claim 17, wherein the top foil comprises a material selected from the group consisting of nickel alloy, beryllium-copper, copper alloys, aluminum alloys, titanium alloys, carbon fiber, and stainless steel alloys.

22. The journal foil bearing system of claim 17, wherein the first underspring layer comprises a material selected from the group consisting of nickel alloy, beryllium-copper, copper alloys, aluminum alloys, titanium alloys, carbon fiber, and stainless steel alloys.

23. The journal foil bearing system of claim 18, wherein the second underspring layer has a spring rate that is higher than a spring rate of the first underspring layer.

24. The journal foil bearing system of claim 17, wherein the leading edge and the trailing edge are pushed against each other.

25. A journal foil bearing system comprising:

a journal member with a bore;

a shaft arranged within the bore for relative coaxial rotation with respect to the journal member;

a top foil disposed between the shaft and journal member; the top foil comprising a leading edge and a trailing edge;

wherein the trailing edge is disposed upstream, from the leading edge, in the direction of the relative coaxial rotation of the shaft;

wherein the leading edge and the trailing edge are pushed against each other;

a first underspring layer disposed between the top foil and the journal member;

a second underspring layer disposed between the first underspring layer and the journal member;

a foil retention slot in communication with the bore; and tabs in the top foil, the first underspring layer, and the second underspring layer;

wherein the tabs fit into the foil retention slot to secure the top foil against wrapping.

26. The journal foil bearing system of claim 25, further comprising an anti-telescoping tab that fits into the foil retention slot to secure the top foil against telescoping.

27. The journal foil bearing system of claim 25, wherein the foil retention slot and tabs have an L- or Z-shape.

28. The journal foil bearing system of claim 25, wherein the first underspring layer is an etched spring comprising a plurality of cantilever beams.

29. The journal foil bearing system of claim 28 wherein:

the plurality of cantilever beams varies in length along a working length of the first underspring layer;

the plurality of cantilever beams maintain an approximately wedge-shaped uniform spacing between the top foil and the shaft matched to a varying pressure force along a working length of the top foil.

30. The journal foil bearing system of claim 29, wherein the first underspring layer and the second underspring layer have a spring rate that increases as the first underspring layer and the second underspring layer deflect around the shaft.

31. The journal foil bearing system of claim 29, wherein the second underspring layer is corrugated.

32. The journal foil bearing system of claim 31, wherein the corrugations have variable wave heights.

33. The journal foil bearing system of claim 32, wherein the corrugations have alternating wave heights.

34. The journal foil bearing system of claim 31 wherein the first underspring and the second underspring are nested.

35. The journal foil bearing system of claim 25, wherein the first underspring layer has a spring rate that varies along a working length of the first underspring layer.

36. The journal foil bearing system of claim 25, wherein the second underspring layer is formed of a material that is thicker than a material of the first underspring layer.

37. The journal foil bearing system of claim 25, wherein the first underspring layer is formed of a material that is thicker than a material of the second underspring layer.

38. The journal foil bearing system of claim 25, wherein the second underspring layer has a spring rate that is higher than a spring rate of the first underspring layer.

39. The journal foil bearing system of claim 25, wherein the first underspring layer has a spring rate that is higher than a spring rate of the second underspring layer.

40. A journal foil bearing system comprising:

a journal member with a bore;

a shaft arranged within the bore for relative coaxial rotation with respect to the journal member;

a top foil disposed between the shaft and journal member; the top foil comprising a leading edge and a trailing edge;

wherein the leading edge and the trailing edge are pushed against each other;

wherein the trailing edge is disposed upstream, from the leading edge, in the direction of the relative coaxial rotation of the shaft;

a plurality of first undersprings disposed between the top foil and the journal member wherein the plurality of first undersprings are circumferentially separated from one another;

a plurality of second undersprings disposed between the plurality of first undersprings and the journal member;

a plurality of foil retention slots in communication with the bore; and tabs in the top foil, the first undersprings, and the second undersprings;

wherein the tabs allow the top foil, the first undersprings, and the second undersprings to be held in the foil retention slots and secured against wrapping.

41. The journal foil bearing system of claim 40, further comprising an anti-telescoping tab that fits into the foil retention slot to secure the top foil against telescoping.

42. The journal foil bearing system of claim 41, wherein the plurality of first undersprings has a spring rate that varies along the working length of the plurality of first undersprings.

43. The journal foil bearing system of claim 41, wherein the plurality of second undersprings has a spring rate that is higher than the spring rate of the plurality of first undersprings.

44. The journal foil bearing system of claim 40, wherein the plurality of second undersprings are circumferentially separated from one another.

45. The journal foil bearing system of claim 40, wherein the plurality of first undersprings comprises etched springs having a plurality of cantilever beams.

46. The journal foil bearing system of claim 45, wherein the plurality of cantilever beams varies in length along a working length of the underspring;

the plurality of cantilever beams maintaining an approximately wedge-shaped uniform spacing between the top foil and the shaft matched to the varying pressure force along the working length of the top foil.

47. The journal foil bearing system of claim 40, wherein the plurality of second undersprings are corrugated.

48. The journal foil bearing system of claim 47, wherein the corrugations have variable wave heights.

49. A journal foil bearing system comprising:

a journal member with a bore;

a shaft arranged within the bore for relative coaxial rotation with respect to the journal member;

a top foil disposed between the shaft and journal member;

the top foil comprising a leading edge and a trailing edge;

wherein the trailing edge is disposed upstream, from the leading edge, in the direction of the relative coaxial rotation of the shaft;

wherein the leading edge and the trailing edge are pushed against each other;

an underspring disposed between the top foil and the journal member;

a foil retention slot in communication with the bore; and tabs in the top foil and the underspring;

wherein the tabs allow the top foil and the underspring to be held in the foil retention slot and secured against wrapping; and wherein the underspring is wound at least twice around the circumference of the top foil.

50. The journal foil bearing system of claim 49, wherein the top foil comprises a material selected from the group consisting of nickel alloy, beryllium-copper, copper alloys, aluminum alloys, titanium alloys, carbon fiber, and stainless steel alloys.

51. The journal foil bearing system of claim 49, wherein the underspring comprises a material selected from the group consisting of nickel alloy, beryllium-copper, copper alloys, aluminum alloys, titanium alloys, carbon fiber, and stainless steel alloys.

52. The journal foil bearing system of claim 49, wherein the foil retention slot and the tabs have an L- or Z-shape.

53. The journal foil bearing system of claim 49, wherein the underspring has a non-linear spring rate matched to the varying pressure force along a working length of the top foil.

54. The journal foil bearing system of claim 49, further comprising an anti-telescoping tab that fits into the foil retention slot to secure the top foil against telescoping.

55. A journal foil bearing system comprising:

a journal member;

a shaft arranged for relative coaxial rotation with respect to the journal member;

a top foil disposed between the shaft and journal member;

wherein the leading edge and the trailing edge are pushed against each other;

a first underspring layer disposed between the top foil and the journal member;

a second underspring layer disposed between the first underspring layer and the journal member;

wherein the first underspring layer provides a variable underspring force for supporting the top foil and maintaining an approximately wedge shaped uniform spacing between the top foil and the shaft;

wherein the spacing is matched to the changing pressure force along a circumferential length of the top foil;

a first anti-telescoping tab located at a leading edge of the top foil;

a second anti-telescoping tab located at a trailing edge of the top foil;

the first anti-telescoping tab shorter than the second anti-telescoping tab;

an anti-wrapping tab located at the distal end of the second anti-telescoping tab;

wherein a distance between the trailing edge and the shaft is shorter than a distance between the leading edge and the shaft;

wherein the trailing edge is disposed upstream, from the leading edge, in the direction of the relative coaxial rotation of the shaft; and wherein the leading edge and the trailing edge are pushed against each other.

56. The journal foil bearing system of claim 55, wherein the anti-wrapping tab supports the first anti-telescoping tab.

57. The journal foil bearing system of claim 55, wherein axially aligned anti-telescoping tabs are located at two axial edges of the top foil.

58. The journal foil bearing system of claim 55, further comprising:

a first anti-telescoping tab located at a leading edge of the first underspring layer; and a second anti-telescoping tab located at a trailing edge of the first underspring layer;

the first anti-telescoping tab longer than the second anti-telescoping tab.

59. The journal foil bearing system of claim 58, wherein the second underspring layer comprises a material selected from the group consisting of nickel alloy, beryllium-copper, copper alloys, aluminum alloys, titanium alloys, carbon fiber, and stainless steel alloys.

60. The journal foil bearing system of claim 55, further comprising:

a first anti-telescoping tab located at a leading edge of the second underspring layer; and a second anti-telescoping tab located at a trailing edge of the second underspring layer;

the first anti-telescoping tab longer than the second anti-telescoping tab.

61. The journal foil bearing system of claim 55, wherein the first underspring layer comprises a material selected from the group consisting of nickel alloy, beryllium-copper, copper alloys, aluminum alloys, titanium alloys, carbon fiber, and stainless steel alloys.

62. The journal foil bearing system of claim 55, wherein the top foil is non-circular.

63. The journal foil bearing system of claim 62, wherein the top foil radius of curvature varies.

64. The journal foil bearing system of claim 63, wherein the top foil radius of curvature is in the range from about 1.005R to about 5R;

wherein R is the shaft radius.

65. The journal foil bearing system of claim 64, wherein the top foil radius of curvature is in the range from about 1.05R to about 2R;

wherein R is the shaft radius.

66. The journal foil bearing system of claim 62, wherein the top foil has a working length in the range from about $1.0003(2R\pi)$ to about $1.010(2R\pi)$;

wherein R is the shaft radius.

67. The journal foil bearing system of claim 66, wherein the top foil has a working length in the range from about $1.003(2R\pi)$ to about $1.010(2R\pi)$;

wherein R is the shaft radius.

* * * * *